United States Patent [19]
Hitomi et al.

[11] Patent Number: 5,427,078
[45] Date of Patent: Jun. 27, 1995

[54] SUPERCHARGING APPARATUS FOR USE IN AN INTERNAL COMBUSTION ENGINE

[75] Inventors: Mitsuo Hitomi; Junsou Sasaki, both of Hiroshima, Japan

[73] Assignee: Mazda Motor Corporation, Hiroshima, Japan

[21] Appl. No.: 124,476

[22] Filed: Sep. 22, 1993

[30] Foreign Application Priority Data

Sep. 28, 1992 [JP] Japan .................. 4-258118

[51] Int. Cl.$^6$ .............. F02B 33/36; F02B 27/00; F01L 1/344
[52] U.S. Cl. ................ 123/559.1; 123/90.15; 123/184.53
[58] Field of Search ............ 60/600–603; 123/559.1, 564, 90.15, 184.53

[56] References Cited

U.S. PATENT DOCUMENTS

| | | | |
|---|---|---|---|
| 4,958,606 | 9/1990 | Hitomi et al. | 123/559.1 X |
| 5,033,268 | 7/1991 | Hitomi et al. | 123/559.1 X |
| 5,090,202 | 2/1992 | Hitomi et al. | 60/602 |
| 5,138,839 | 8/1992 | Hitomi et al. | 60/602 |

FOREIGN PATENT DOCUMENTS

63-239312  10/1988  Japan.
2-119624   5/1990   Japan.

Primary Examiner—Michael Koczo
Attorney, Agent, or Firm—Fish & Richardson

[57] ABSTRACT

A supercharging apparatus for an internal combustion engine comprises an intake air passage communicating with a cylinder of an engine through an intake valve; a mechanical supercharger provided in the intake air passage; a variable valve timing mechanism for varying a closing timing of the intake valve with respect to a bottom dead center of an engine piston; a control unit for controlling the variable valve timing mechanism in accordance with an engine speed at least in a supercharging region wherein the mechanical supercharger is operative to supply supercharged air into the cylinder, in such a manner that the closing timing of the intake valve is switched between an advanced timing and a delayed timing; and an assist intake system for causing a dynamic supercharging effect in the intake air passage when the closing timing of the intake valve is switched to the delayed timing, thereby assisting the mechanical supercharger in a low engine operational region.

8 Claims, 4 Drawing Sheets

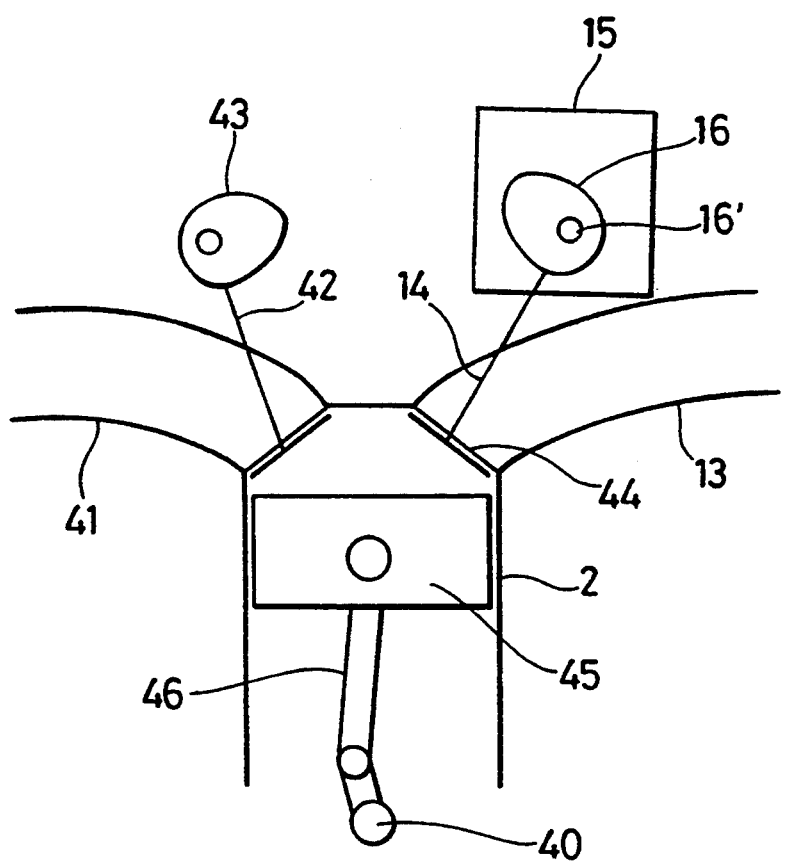

SUPERCHARGING APPARATUS FOR USE IN AN INTERNAL COMBUSTION ENGINE

BACKGROUND OF THE INVENTION

The present invention relates generally to a supercharging apparatus for an internal combustion engine equipped with a mechanical supercharger, and more particularly to a supercharging apparatus for an internal combustion engine which is capable of varying valve closing timing of an in take valve in accordance with an engine operational condition.

There has been conventionally proposed various supercharging systems for an internal combustion engine equipped with a mechanical supercharger. For example, Unexamined Japanese Patent Publication No. 63-239312 discloses an engine control technique improving knocking without reducing intake air charging efficiency. For this end, this prior art discloses a variable valve timing means to largely delay the closing timing of an intake valve or enlarge an overlap between the intake and exhaust valves.

This technique is excellent in view of bringing numerous advantages in various controls of an engine equipped with a supercharger. However, there are some aspects to be further improved. For example, when the closing timing of the intake valve is largely delayed, the mechanical supercharger tends to receive an increased resistance especially in a low engine speed region. Because intake air once introduced into the cylinder is partly fed back toward the intake pad, sage as the intake valve opens late until the compression stroke progresses.

For this reason an increased resistance or load is imparted on the mechanical supercharger in this engine operational condition. Although the power of the supercharger may be forcibly increased, the resistance or load will be correspondingly increased. This apparently results in worse fuel economy.

The Unexamined Japanese Patent Publication No. 2-119624 discloses another engine control technique wherein a maximum supercharging pressure from the supercharger is changeable in accordance with an engine speed. In order to reduce the shock occurring in the change of the maximum supercharging pressure, this prior art proposes to cooperatively utilize dynamic supercharging effect so as to cancel or moderate this shock. However, the teaching of this latter prior art cannot be directly used for solving the above-described problem of the former prior art since the problem inherently relates to the delayed valve closing timing of the intake valve.

SUMMARY OF THE INVENTION

Accordingly, in view of the above-described problems, the present invention has an object to provide an improved supercharging apparatus for an internal combustion engine equipped with a mechanical supercharger which is capable of reducing excessive load imparted on the mechanical supercharger in the condition where the valve closing timing is largely delayed without deteriorating fuel economy.

In order to accomplish the above object, the present invention provides a supercharging apparatus for an internal combustion engine comprising: an intake air passage communicating with a cylinder of an engine through an intake valve; a mechanical supercharger provided in the intake air passage; variable valve timing means for varying a closing timing of the intake valve with respect to a bottom dead center of an engine piston; control means for controlling the variable valve timing means in accordance with an engine speed at least in a supercharging region wherein the mechanical supercharger is operative to supply supercharged air into the cylinder, in such a manner that the closing timing of the intake valve is switched between an advanced timing and a delayed timing; and assist means for causing a dynamic supercharging effect in the intake air passage when the closing timing of the intake valve is switched to the delayed timing, thereby assisting the mechanical supercharger in this specific engine operational region. With this arrangement, load of the mechanical supercharger can be effectively reduced in the specific engine operational region where the mechanical supercharger receives an increased resistance and intake air charging amount is reduced due to delayed valve closing timing of the intake valve. Thus, fuel economy will be improved.

Also, it is preferable that the control means controls the variable valve timing means to select the delayed timing in a low engine speed region and select the advanced timing in a high engine speed region. Accordingly, the consumption of fuel can be economically reduced.

Furthermore, it is preferable that the variable valve timing means changes a phase of a valve lift curve of the intake valve so as to realize first and second valve timings. The first valve timing has a delayed intake valve closing timing and a small valve overlap between the intake and exhaust valves compared with the second valve timing. Thus, it becomes possible to prevent the mixture of fuel and fresh air from being directly passing through the cylinder and the air-fuel mixture temperature, from excessively increasing when the first valve timing is selected. Furthermore, it becomes possible to promote scavenging of exhaust gas if the second valve timing is selected.

More specifically, it is preferable that the control means controls the variable valve timing means to select the first valve timing in a low engine speed region and select the second valve timing in a high engine speed region. The assist means causes a resonance supercharging effect in the intake air passage in the low engine speed region. In the high engine speed region, residual exhaust gas is entirely removed from the combustion chamber so as to cause no knocking. In the low engine speed region, fuel consumption is improved and also dynamic supercharging can be accomplished by a relatively compact intake system.

Still further, it is preferable that the assist means comprises means for changing a resonance frequency of the intake air passage so as to cause resonance supercharging effect at different engine speed regions within the low engine speed region. Thus, resonance supercharging effect can be obtained in a relatively wide region in the low engine speed region.

Furthermore, it is preferable that the changing means comprises a plurality of communication passages arranged on downstream of an upstream joining point of a first intake passage communicating with a first group of cylinders and a second intake passage communicating with a second group of cylinders, the communicating passages being adapted for communicating the first and second intake passages, and a valve disposed in each of the communication passages for opening and closing the communication passage. Thus, resonance supercharging effect can be obtained in a simpler construction.

The above and other objects, features and advantages of the present invention will become more apparent from the following detailed description which is to be read in conjunction with the accompanying drawings.

BRIEF DESCRIPTION OF THE DRAWINGS

FIG. 6 is a cross-sectional view showing an engine cylinder and its peripheral components.

DETAILED DESCRIPTION OF THE PREFERRED EMBODIMENT

Hereinafter, a preferred embodiment of the present invention will be explained in detail with reference to accompanying drawings.

Figure 1:
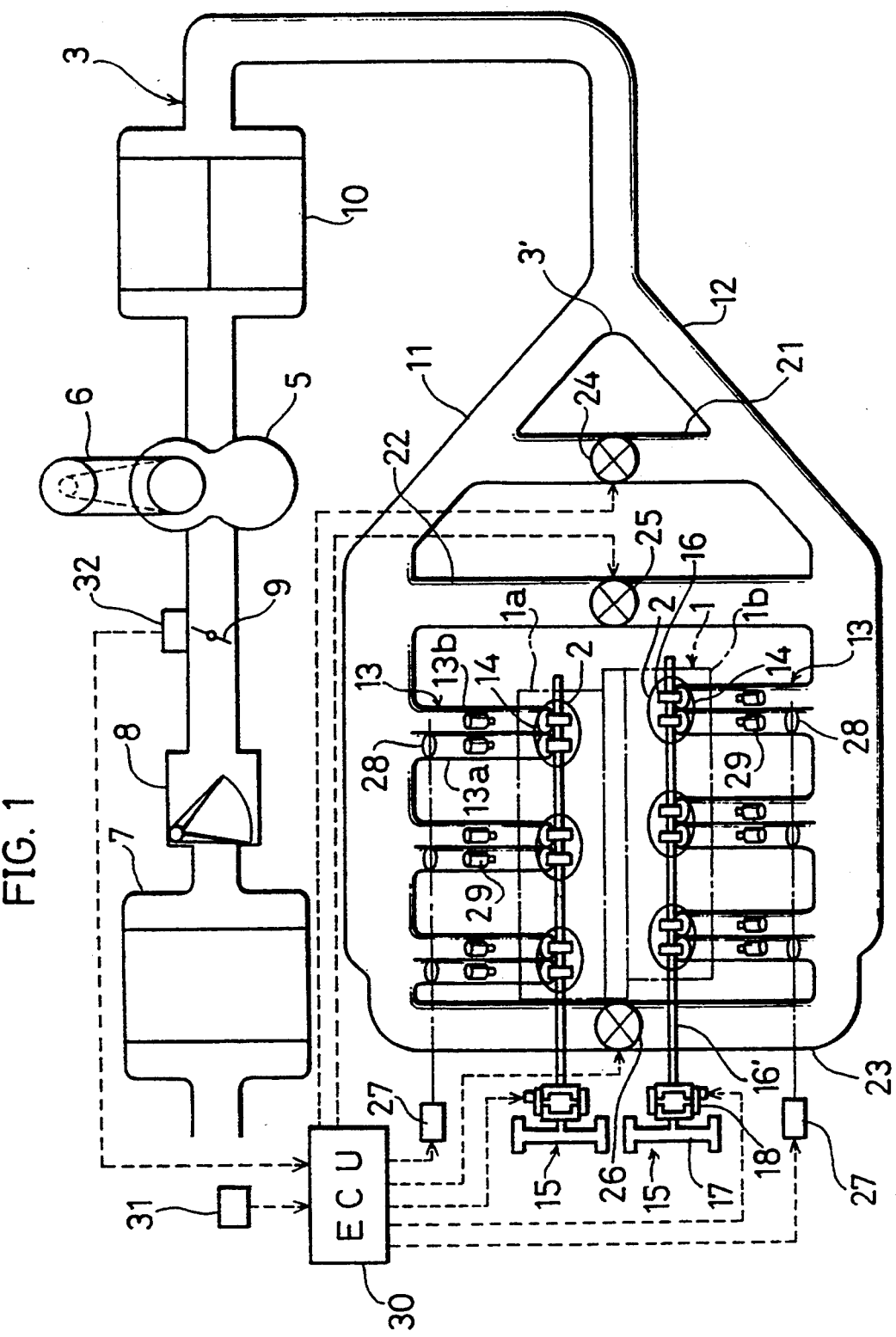
FIG. 1 is a view showing a supercharging apparatus for an internal combustion engine in accordance with the present invention.

FIG. 1 shows a supercharging apparatus for an internal combustion engine in accordance with the present invention. FIG. 6 shows an engine cylinder and its vicinity. In the drawings, a reference numeral 1 represents an engine accommodating a plurality of cylinders 2 therein. More specifically, the engine 1 includes a pair of banks 1a and 1b which forms a V-type 6-cylinder engine. Namely, each of the banks 1a and 1b consists of three cylinders 2, 2, and 2.

An intake air passage 3 is connected with the engine 1 to supply air to the cylinders 2,2, - - - ,2 of the engine 1. There is provided a mechanical supercharger 5 at an intermediate portion of the, intake air passage 3. This mechanical supercharger 5 is connected with an output shaft 40 of the engine by means of an appropriate transmission mechanism such as a belt 6 or its equivalent so as to cause a rotation in proportion to an engine rotational speed.

An air cleaner 7, an airflow meter 8, and a throttle valve 9 are provided upstream of the mechanical supercharger 5. Intake air, after having passed through the air cleaner 7, enters into the airflow meter 8, in which an airflow amount of the intake air is measured. The throttle valve 9 is responsively connected to an accelerator pedal through an appropriate linkage so as to directly transmit a depression amount of the accelerator pedal as an accelerator demand of an engine operator. Namely, the throttle valve 9 controls an overall intake air amount to be supplied into the cylinders 2. Provided downstream of the mechanical supercharger 5 is an intercooler 10 which cools down the supercharged air fed from the mechanical supercharger 5.

The intake air passage 3 downstream of the intercooler 10 is bifurcated into a first intake air passage 11 and a second intake air passage 12. The first intake passage 11 is further separated into three independent intake passages 13 downstream thereof. These intake passages 13 are communicated with corresponding cylinders 2 of the bank 1a, respectively. In the same manner, the second intake passage 12 is separated into another three independent intake passages 13 downstream thereof. These another intake passages 13 are communicated with corresponding cylinders of the other bank 1b, respectively. More specifically, each of the independent intake passages 13 is communicated with the corresponding cylinder 2 through two intake valves 14. An engine exhaust passage 41 is also communicated with the cylinder 2 through the exhaust valve 42. The exhaust valve 42 is opened or closed by an associated cam 43.

There is provided an appropriate valve drive means so as to change the open or close timing of each intake valve 14. This valve drive means includes a pair of variable valve timing mechanisms 15. Each variable valve timing mechanism 15 is operative to change the valve open/close timing by shifting the phase of a cam 16 of each intake valve 14. In other words, this variable valve timing mechanism 15 shifts the phase of a valve lift curve of the intake valve 14. The valve lift curve is generally defined as a relationship between an intake valve clearance from a valve seat 44 versus a crank angle.

Shifting the valve lift curve of the intake valve is usually effective not only to vary the valve open/close timing of the intake valve itself but to vary a valve overlap between the intake and exhaust valves 14 and 42. In this embodiment, the exhaust valve 42 is stationary while the intake valve 14 is changeable in it's valve open/close timings by means of the variable valve timing mechanism 15. In this case, the more the intake valve open/close timing is delayed, the smaller the overlap becomes. This condition is referred to as a first valve timing hereinafter in this embodiment. On the contrary, the valve overlap between the intake and exhaust valves 14 and 42 becomes large as the intake valve open/close timing is advanced. This condition is referred to as a second valve timing hereinafter in this embodiment. Namely, this variable valve timing mechanism 15 serves as a means for switching the valve timing of the intake valve 14 between above-specified first and second valve timings.

There are various types of variable valve timing mechanisms. Although the present invention does not intend to limit the variable valve timing mechanism 15 into a specific type, the variable valve timing mechanism 15 of the present embodiment may include a cam shaft 16' forming a plurality of cams 16 thereon for actuating associated intake valves 14, a cam pulley 17 rotating integrally together with the engine output shaft 40, and a phase shift member 18 interposed between the cam shaft 16' and cam pulley 17 so as to connect them through helical gears or the like. In response to a control signal, the phase shift member 18 operates to change a mutual phase between the cam pulley 17 and the cam shaft 16'.

The intake passage 3 includes various auxiliary passages and valves, which are intentionally provided for changing the effective passage length relating to pressure propagation. For example, a first communication passage 21, provided relatively close to the bifurcated point of the intake passage 3, connects the first and second intake passages 11 and 12 at predetermined portions thereof. A second communication passage 22, provided downstream of the first communication passage 21, connects the first and second intake passages 11 and 12 at another predetermined location. A third communication passage 23, provided opposite to the first and second communication passages 21 and 22 with respect to the engine body 2, connects the first and second intake passages 11 and 12 at still other predetermined portions thereof. Among three communication passages 21, 22, and 23, the first communication passage 21 is located the furthest from the independent intake passages 13. The third communication passage 23 is located closest to the independent intake passages 13.

There are provided valves 24, 25, and 26 inside the first, second, and third communication passages 21, 22, and 23, respectively. In response to control signals, these valves 24, 25, and 26 open or close the corresponding communication passages 21, 22, and 23.

The intake passages 11,12, the communication passages 21–23, and the valves 24–26 cooperate to define an assist means for causing a dynamic supercharging effect in the intake air passage 3 so as to assist the mechanical supercharger 5 in the specific engine operational region described later. More specifically, this assist means changes a resonance frequency of the intake air passage 3 so as to cause resonance supercharging effect at different engine speed regions within a specific engine speed region.

In order to bring the resonance effect, the cylinders 2, belong to the same bank of the V-shape engine are not contiguous with each other in their intake strokes. Namely, the first intake passage 11 is connected via independent intake passages 13 to one group of cylinders 2 whose intake strokes are not contiguous with each other. The second intake passage 12 is connected via another independent intake passage 13, to the other group of cylinders 2 whose intake strokes are not contiguous with each other.

An intake passage portion from respective cylinders 2 to the first and second intake air passages 11 and 12 via the independent intake passages 13 and the valves 24–26 define a resonance supercharging arrangement. Thus, resonance effect develops at a certain engine rotational speed where the resonance frequency of the resonance supercharging arrangement harmonizes with the pressure propagation caused by the intake operations of respective cylinders 2.

More specifically, in the case where the valves 24, 25, and 26 are all closed, the resonance supercharging arrangement causes a resonance effect at a low engine speed because the effective passage length from respective cylinders 2 to the bifurcated point 3' of the first and second intake passages 11, 12 becomes relatively long. If the valve 24 in the first communication passage 21 is opened, the resonance supercharging arrangement causes a resonance effect at a higher engine speed. This is because the effective passage length from respective cylinders 2 to the first communication passage 21 is shorter than the above value. In the same manner, if the valve 25 in the second communication passage 22 is opened, the resonance supercharging arrangement causes resonance effect at a further higher engine speed, because the effective passage length from respective cylinders 2 to the second communication passage 22 is far shorter than above value. It is doubtless that the resonance supercharging arrangement causes resonance effect at a still higher engine speed region when the valve 26 in the third communication passage 23 is opened, because, the effective length from the respective cylinders 2 to the third communication passage 23 is shortest.

In each independent intake passage 13, a longitudinally extending partition wall is provided to divide this passage into two slender passages 13a, 13b. One of these slender passage 13a, 13b, i.e. the passage 13a, is provided with a control valve 28. An actuator 27 is operatively provided to open or close this control valve 28. If the control valve 28 opens the slender passage 13a, an overall cross section of the independent intake passage 13 increases than in the condition where only the other slender passage 13b is opened. This increase of the cross section generally results in increase of the resonance frequency.

The slender passages 13a and 13b are respectively provided with an injector 29 supplying fuel to the communicated cylinder 2.

A reference numeral 30 represents a control unit (abbreviated as ECU) which performs various controls including a valve timing control as well as a control of causing dynamic supercharging effect. The control unit 30, usually constituted by a micro computer, receives signals from a rotational speed sensor 31 detecting an engine speed, a throttle valve opening sensor 32 detecting an opening degree of the throttle valve 9, and others. The control unit 30 generates a valve timing control signal fed to the variable valve timing mechanism 15 in response to the signals obtained from above sensors 31, 32,--. Furthermore, the control unit 30 generates other control signals which are supplied to the valves 24, 25, 26 In the communication passages 21, 22, 23 and to the actuator 27 of the control valve 28 in the slender passage 13a.

Figure 2:
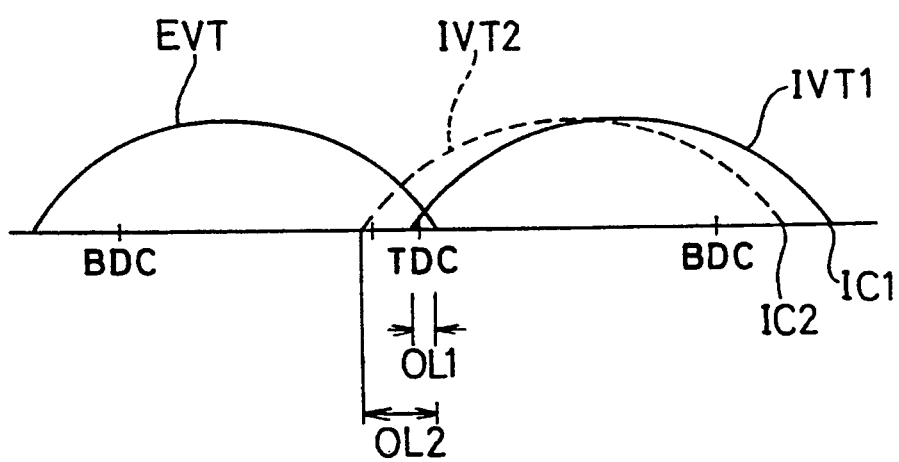
FIG. 2 illustrates valve lift curves (i.e. valve open/-close timings) of intake and exhaust valves in accordance with the present invention.
Figure 3:
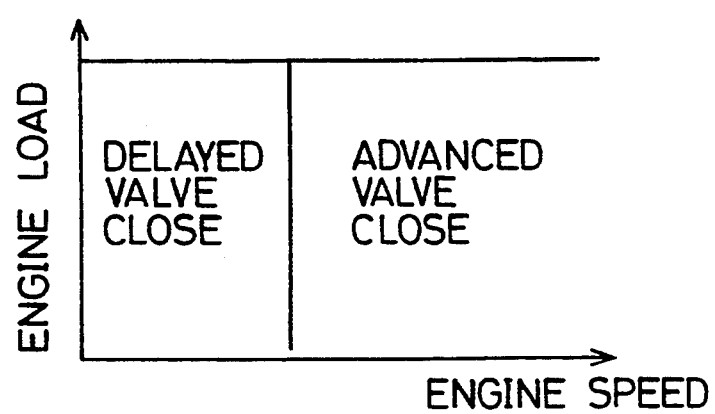
FIG. 3 is a graph showing a control map used in a control unit for controlling the variable valve timing mechanism.

FIG. 2 illustrates valve open/close timings (i.e. valve lift curves) of the intake and exhaust valves 14, 42. FIG. 3 shows a control map used in the control unit 30 for controlling the variable valve timing mechanism 15. Three curves of FIG. 2 schematically depict valve lift curves of the intake/exhaust valves versus a crank angle. In FIG. 2, a valve lift curve EVT represents a stationary exhaust valve open/close timing. Two valve lift curves IVT1 and IVT2 represent intake valve open/close timings selectable by the variable valve timing mechanism 15. Namely, the valve lift curve (i.e. valve open/close timing) of the exhaust valve always fixed as the valve lift curve EVT. Meanwhile, the valve lift curve (i.e. valve open/close timing) of the intake valve 14 is switchable between the valve lift curves IVT1 and IVT2. The variable valve timing mechanism 15 operates to select either one of these valve lift curves IVT1 and IVT2.

The valve lift curve IVT1 is distinctive in that the intake valve 14 closes at a relatively delayed crank angle IC1 and an overlap OL1 between the intake and exhaust valves 14, 42 is relatively small. On the contrary, the valve curve IVT2 is distinctive in that the intake valve 14 closes at a relatively advanced crank angle IC2 and the overlap OL2 between the intake and exhaust valves 14, 42 is relatively large.

In the drawing, a point TDC denotes a top dead center of an engine piston 45 and its crankshaft arm 46 when at the top or outer end of its stroke. A point BDC denotes a bottom dead center of the engine piston 45 and its crankshaft arm 46 when at the bottom or inner end of its stroke. Therefore, in any case of the valve close timings IC1 and IC2, the intake valve 14 closes at a certain crank angle after BDC. Furthermore, in any case of the overlaps OL1 and OL2, an amount of the overlap between the intake and exhaust valves 14, 42 is a certain positive value.

That is to say, the variable valve timing mechanism 15 changes the phase of the valve lift curve of the intake valve 14 so as to realize first and second valve timings previously defined in the foregoing description. The valve lift curve IVT1 realizes the first valve timing characterized by the delayed valve closing timing IC1 of the intake valve 14 and a small overlap OL1 between the intake and exhaust valves 14, 42. In case of this first valve timing, the intake valve close timing IC1 is fairly delayed from the BDC so that an effective compression ratio of the cylinder 2 becomes small compared with an expansion ratio of the cylinder 2. This is advantageous in that a pumping loss is decreased in its intake stroke and an exhaust gas temperature is favorably cooled down in its expansion stroke. The effective compression ratio is generally defined as a ratio of a cylinder volume at the TDC versus a cylinder volume at the intake valve close timing. Meanwhile, the expansion ratio is generally defined as a ratio of the cylinder volume at the TDC versus a cylinder volume at the exhaust valve open timing.

In case of the second valve timing, the overlap OL2 between the intake and exhaust valves 14, 42 is fairly large. This results in that exhaust gas is satisfactorily scavenged from the combustion chamber by a high pressure of supercharged air introduced into the combustion chamber during this long overlap period OL2. This is preferable to prevent intake air from being adversely heated by the residual exhaust gas. As well known in the field of the engine technologies, increasing the temperature of an intake air usually induces a knocking in the succeeding compression stroke.

Specific values adopted for the engine of this embodiment are as follows: An open timing of the exhaust valve is set to BBDC 50° CA, where BBDC stands for "before bottom dead center". A closing timing of the exhaust valve is set to ATDC 10° CA, where ATDC stands for "after top dead center". According to the first valve timing IVT1, an open timing of the intake valve 14 is set to BTDC 4° CA, where BTDC stands for "before top dead center". A close timing of the intake valve 14 is set to ABDC 66° CA, where ABDC stands for "after bottom dead center". According to the second valve timing IVT2, an open timing of the intake valve 14 is set to BTDC 34° CA and a close timing of the intake valve 14 is set to ABDC 36° CA. Hence, the overlap OL1 according to the first valve timing becomes 14° CA and the overlap OL2 according to the second valve timing becomes 44° CA.

As shown in FIG. 3, the control unit 30 designates a preferable valve timing for the variable valve timing mechanism 15 in accordance with the engine operational condition. The first valve timing IVT1, i.e. a delayed intake valve close timing, is set in a low engine speed region. On the other hand, the second valve timing IVT2. i.e. an advanced intake valve close timing, is set in a high engine speed region.

Figure 4:
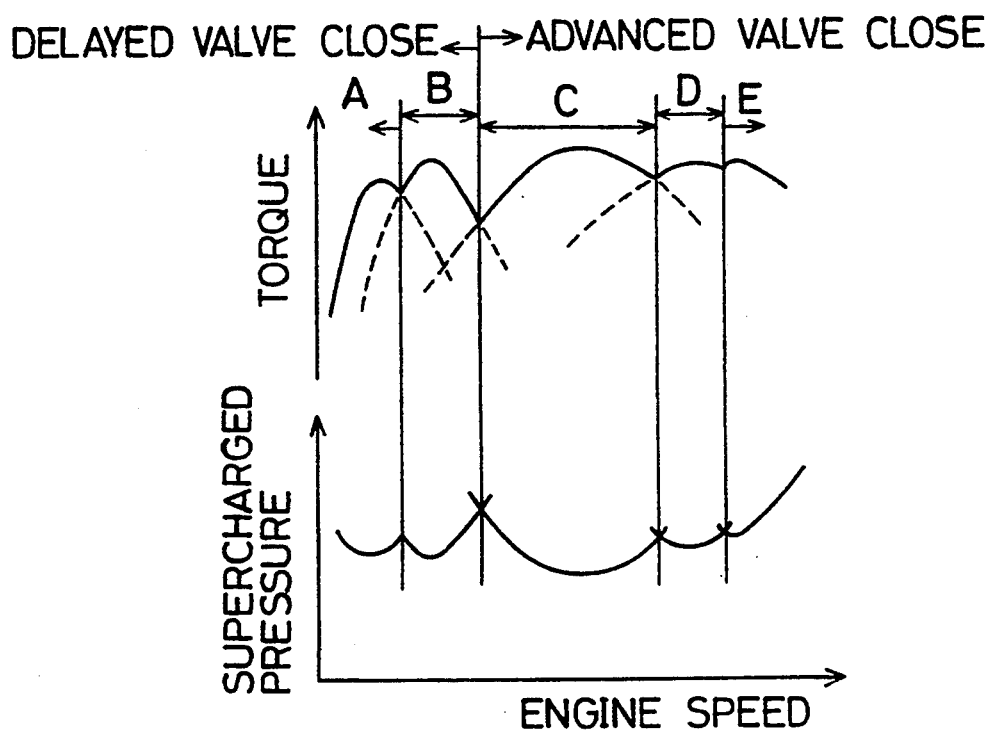
FIG. 4 is a graph showing control characteristics of various valves for causing dynamic supercharging effect.

FIG. 4 shows the control characteristics of previously explained valves 24–26 and 28 for causing dynamic supercharging effect. Illustrated together in FIG. 4 is a supercharging pressure expected.

The control unit 30 basically divides the control region into several (e.g. five) regions in accordance with the engine speed and specifies these regions as A, B, C, D, and E engine speed regions. The engine speed regions A and B are the lowest and second lowest engine speed regions. In these engine speed regions A and B, the intake valve timing is assigned to the first valve timing IVT1, i.e. a delayed intake valve close timing. In the engine speed region A, all the valves 24–26 and 28 are closed. In the engine speed region B, only the valve 24 of the first communication passage 21 is opened. In respective engine speed regions A and B, a peak torque is obtained at a certain, resonance frequency of the resonance supercharging arrangement differentiated by the opening/closing of the valve 24.

The engine speed regions C, D, and E are middle and higher engine speed regions. In these engine, speed regions C, D, and E, the intake valve timing is assigned to the second valve timing IVT2, i.e. an advanced intake valve close timing. In the engine speed region C, the valve 25 in the second communication passage 22 is opened. In the engine speed region D, the valve 26 in the third communication passage 23 is opened. Finally, in the highest engine speed region E, the valve 28 in the independent intake passage 13a is opened. In respective engine speed regions C, D, and E, a peak torque is obtained at a certain resonance frequency of the resonance supercharging intake system differentiated by the variation of open/close of the valves 25, 26, and 28.

In accordance with the arrangement of the present invention, the second valve timing IVT2 is selected in the high engine speed region. Thus, the valve overlap between the intake and exhaust valves 14, 42 becomes large. In the condition where the mechanical supercharger 5 is operative, an intake air pressure is generally higher than an exhaust gas pressure. The longer the overlap is, the more the residual exhaust gas is scavenged from the combustion chamber. This promotion of scavenging exhaust gas is effective to cool down the combustion chamber because high-temperature exhaust gas is satisfactorily removed from the combustion chamber. Furthermore, intake air is prevented from being heated through heat-exchange between the high-temperature exhaust gas and the intake air. As a result, a knocking in the compression stroke is effectively prevented.

Still further, a charging amount of an intake air is increased as the residual exhaust gas is reduced. Also, advancing the closing timing of the intake valve is advantageous in increasing volumetric efficiency.

On the other hand, the first valve timing IVT1 is selected in the low engine speed region. Thus, the valve overlap between the intake and exhaust valves 14, 42 becomes small and the intake valve closes late. Reducing the valve overlap period prevents the mixture of fresh air and fuel from passing through the combustion chamber without being burnt. This results in improvement of fuel consumption and emission in the low engine speed region.

In general, a smaller overlap tends to cause a knocking due to worse scavenging efficiency. This disadvantage is, however, automatically canceled by the reduction of the effective compress ion ratio because the valve closing timing IC1 of the intake valve is inherently delayed according to the first valve timing IVT1. Meanwhile, the reducing of effective compression ratio is compensated by resonance supercharging so as to satisfactorily compress air-fuel mixture. Although air temperature increases to a certain extent through pressurization in the mechanical supercharger 5, the intercooler 10 disposed downstream thereof cools down the heated air. Thus, the temperature increase of air-fuel mixture can be adequately suppressed so as to cause no knocking during the compression stroke.

Next, it should be noted that the mechanical supercharger 5 may receive an increased resistance when supplying supercharged air into the cylinder 2 in case of the first valve timing IVT1. This is because intake air once introduced into the cylinder 2 is partly fed back toward the intake passage 3 as the intake valve 14 opens late until the compression stroke fairly progresses. For this reason, an increased resistance or load is imparted on the mechanical supercharger 5 in the low engine speed region.

Figure 5:
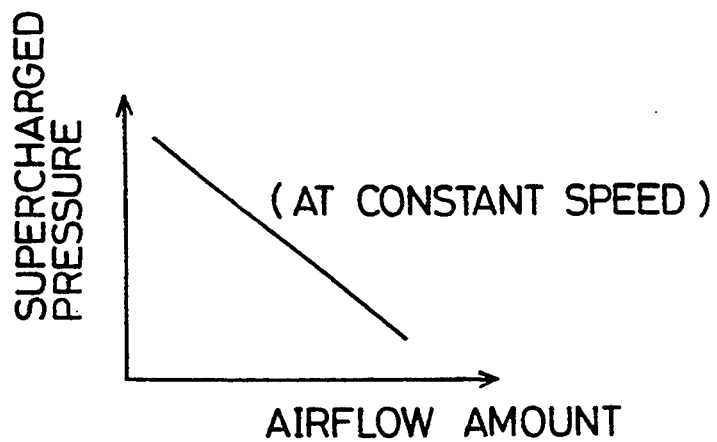
FIG. 5 is a graph showing a relationship between a supercharged pressure (i.e. an outlet side pressure of the supercharger) and a supercharged airflow amount under the condition that the mechanical supercharger rotates at a constant speed.

FIG. 5 shows a relationship between a supercharged pressure (i.e. an outlet side pressure of the supercharger) and a supercharged airflow amount under the condition that the mechanical supercharger 5 rotates at a constant speed. As shown in FIG. 5, airflow amount decreases with increasing supercharged pressure due to increase of air leakage in the mechanical supercharger 5. Accordingly, a resistance increase in the intake passage 3 between the supercharger 5 and the cylinder 2 induces a reduction of intake air charging amount which, in turn, results in a torque reduction. It is not effective to forcibly increase a supercharging power of the mechanical supercharger 5 because it is apparent that a correspondingly increased resistance or load is imparted on the mechanical supercharger 5.

In order to solve this problem, the present invention utilizes a resonance supercharging effect. As explained, in respective engine speed regions A and B, a torque peak is obtained by the resonance supercharging effect. Thus, the resonance supercharging arrangement (i.e. the bifurcated intake passages 11, 12, the communication passages 21-23, the divided independent intake passages 13a, 13b, and the valves 24-26 and 28) in accordance with the present invention serves to assist the mechanical supercharger 5 in the low engine speed region. As a result, the resistance or load of the supercharger is adequately reduced and therefore a higher output torque can be obtained as shown in FIG. 4. It is needless to say that, in the respective engine speed regions C, D, and E, a torque peak is obtained by the function of the resonance supercharging arrangement in the same manner.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to be embraced by the claims.

What is claimed is:

1. A supercharging apparatus for an internal combustion engine comprising:
    an intake air passage communicating with a cylinder of an engine through an intake valve;
    a mechanical supercharger provided in said intake air passage;
    variable valve timing means for varying a closing timing of said intake valve with respect to a bottom dead center of an engine piston;
    control means for controlling said variable valve timing means so that said closing timing of the intake valve is set at a delayed timing in a low engine speed region while set at an advanced timing in a high engine speed region;
    assist means for causing a dynamic supercharging effect in said intake air passage when said closing timing of the intake valve is switched to said delayed timing, thereby assisting said mechanical supercharger in this specific engine operational region, and
    wherein said control means controls said variable valve timing means to select said delayed timing in a low engine speed region and select said advanced timing in a high engine speed region.

2. A supercharging apparatus for an internal combustion engine in accordance with claim 1, wherein said variable valve timing means changes a phase of a valve lift curve of said intake valve so as to realize first and second valve timings, said first valve timing having a delayed intake valve closing timing arid a small valve overlap between the intake and exhaust valves compared with said second valve timing.

3. A supercharging apparatus for an internal combustion engine in accordance with claim 2, wherein said control means controls said variable valve timing means to select said first valve timing in a low engine speed region and select said second valve timing in a high engine speed region, and said assist means causes a resonance supercharging effect in the intake air passage in said low engine speed region.

4. A supercharging apparatus for an internal combustion engine in accordance with claim 3, wherein said assist means comprises means for changing a resonance frequency of said intake air passage so as to cause resonance supercharging effect at different engine speed regions within said low engine speed region.

5. A supercharging apparatus for an internal combustion engine in accordance with claim 4, wherein said engine comprises a plurality of cylinders, and said assist means further comprises a main intake passage, a first intake passage communicated with a first group of cylinders, and a second intake passage communicated with a second group of cylinders, the cylinders belonging to the same group being not contiguous with each other in their intake orders, the first and second intake passages joining to the main intake passage at an upstream point, wherein said changing means comprises a plurality, of communication passages arranged downstream of the joining point for communicating the first and second intake passages, and valves respectively disposed in the plurality of communication passages for opening and closing the respective communication passages.

6. A supercharging apparatus for an internal combustion engine comprising:
    an intake air passage communicating with a cylinder of an engine through an intake valve;
    a mechanical supercharger provided in said intake air passage;
    variable valve timing means for varying a closing timing of said intake valve with respect to a bottom dead center of an engine piston;
    control means for controlling said variable valve timing means to change the phase of a valve lift curve of said intake valve to selectively realize first and second valve timings in accordance with the engine speed, said first valve timing having a delayed intake valve closing timing and a small valve overlap between the intake and exhaust valves compared with said second valve timing;
    assist means for causing a dynamic supercharging effect in said intake air passage when said closing timing of the intake valve is switched to said delayed timing, thereby assisting said mechanical supercharger in this specific engine operational region;

wherein said variable valve timing means changes a phase of a valve lift curve of said intake valve so as to realize first and second valve timings, said first valve timing having a delayed intake valve closing timing and a small valve overlap between the intake and exhaust valves compared with said second valve timing; and wherein said control means controls said variable valve timing means to select said first valve timing in a low engine speed region and select said second valve timing in a high engine speed region, and said assist means causes a resonance supercharging effect in the intake air passage in said low engine speed region.

7. A supercharging apparatus for an internal combustion engine in accordance with claim 6, wherein said assist means comprises means for changing a resonance frequency of said intake air passage so as to cause resonance supercharging effect at different engine speed regions within said low engine speed region.

8. A supercharging apparatus for an internal combustion engine in accordance with claim 7, wherein said engine comprises a plurality of cylinders, and said assist means further comprises a main intake passage, a first intake passage communicated with a first group of cylinders, and a second intake passage communicated with a second group of cylinders, the cylinders belonging to the same group being not contiguous with each other in their intake orders, the first and second intake passages joining to the main intake passage at an upstream point, wherein said changing means comprises a plurality of communication passages arranged on downstream of the joining point for communicating the first and second intake passages, and valves respectively disposed in the plurality of communication passages for opening and closing the respectively communication passages.

* * * * *